United States Patent
Suhara et al.

(10) Patent No.: US 6,929,883 B2
(45) Date of Patent: Aug. 16, 2005

(54) LITHIUM-TRANSITION METAL COMPOSITE OXIDE

(75) Inventors: Manabu Suhara, Kanagawa (JP); Megumi Yukawa, Kanagawa (JP); Naoshi Saito, Kanagawa (JP); Takashi Kimura, Kanagawa (JP); Kazuo Sunahara, Kanagawa (JP)

(73) Assignee: Seimi Chemical Co., Ltd., Kanagawa (JP)

( * ) Notice: Subject to any disclaimer, the term of this patent is extended or adjusted under 35 U.S.C. 154(b) by 265 days.

(21) Appl. No.: 10/296,205

(22) PCT Filed: May 30, 2001

(86) PCT No.: PCT/JP01/04524
§ 371 (c)(1),
(2), (4) Date: Nov. 29, 2002

(87) PCT Pub. No.: WO01/92158
PCT Pub. Date: Dec. 6, 2001

(65) Prior Publication Data
US 2004/0023113 A1 Feb. 5, 2004

(30) Foreign Application Priority Data
May 30, 2000 (JP) .................................. 2001-106102

(51) Int. Cl.$^7$ .......................... H01M 4/58; H01M 4/36; H01M 4/52; H01M 4/50
(52) U.S. Cl. ................. 429/231.95; 429/220; 429/223; 429/224; 429/231.1; 429/231.5
(58) Field of Search ........................... 429/231.95, 220, 429/223, 224, 231.1, 231.5

(56) References Cited

U.S. PATENT DOCUMENTS

| | | | | |
|---|---|---|---|---|
| 5,780,181 A | * | 7/1998 | Idota et al. .................. | 429/332 |
| 6,053,953 A | * | 4/2000 | Tomiyama et al. ........ | 29/623.1 |
| 6,132,903 A | * | 10/2000 | Fujimoto et al. ...... | 429/231.95 |
| 6,190,803 B1 | * | 2/2001 | Tomiyama et al. ......... | 429/245 |
| 6,605,386 B1 | * | 8/2003 | Kasamatsu et al. ...... | 429/218.1 |
| 2004/0023113 A1 | | 2/2004 | Suhara et al. | |

FOREIGN PATENT DOCUMENTS

| | | |
|---|---|---|
| JP | 05-094822 | 4/1993 |
| JP | 10-279316 | 10/1998 |
| JP | 11-097015 | 4/1999 |
| JP | 2000-082466 | 3/2000 |

OTHER PUBLICATIONS

U.S. Appl. No. 10/916,391, filed Aug. 12, 2004, Suhara et al.
U.S. Appl. No. 10/296,205, filed Nov. 29, 2002, Suhara et al.
U.S. Appl. No. 10/849,856, filed May 21, 2004, Suhara et al.
U.S. Appl. No. 10/296,205, filed Nov. 29, 2002, Suhara et al.
U.S. Appl. No. 10/296,205, filed Nov. 29, 2002, Suhara et al.
U.S. Appl. No. 10/743,479, filed Dec. 23, 2003, Suhara et al.
U.S. Appl. No. 10/089,109, filed Mar. 26, 2002, Suhara et al.
U.S. Appl. No. 10/296,205, filed Nov. 29, 2002, Suhara et al.

* cited by examiner

Primary Examiner—Stanley S. Silverman
Assistant Examiner—Jonas N. Strickland
(74) Attorney, Agent, or Firm—Oblon, Spivak, McClelland, Maier & Neustadt, P.C.

(57) ABSTRACT

The present invention provides a lithium-transition metal composite oxide having a large volume capacity density, high safety, excellent coating uniformity, excellent charge/discharge cycle durability and excellent low temperature characteristics, and suitable as a positive electrode active material for a lithium secondary cell.

A lithium-transition metal composite oxide which is represented by the formula $Li_xM_{1-y}N_yO_2$ (wherein $0.2 \leq x \leq 1.2$, $0 \leq y \leq 0.7$, M is a transition metal element, and N is a transition metal element other than M or an alkaline earth metal element), wherein in the distribution curve of the cumulative volume particle size of said lithium composite oxide, the inclination of the curve at a cumulative volume fraction of 20% and 80% are at most 9%/$\mu$m and at least 3%/$\mu$m, respectively, and the average particle size is from 3 to 20 $\mu$m.

15 Claims, 2 Drawing Sheets

US 6,929,883 B2

LITHIUM-TRANSITION METAL COMPOSITE OXIDE

TECHNICAL FIELD

The present invention relates to a lithium-transition metal composite oxide having a layer structure, a positive electrode for a lithium secondary cell employing it, and a cell employing the positive electrode.

BACKGROUND ART

In recent years, along with the progress in portable or codeless equipments, a demand is mounting for a non-aqueous electrolyte secondary cell which is small in size and light in weight and has a high energy density. As an active material for a non-aqueous electrolyte secondary cell, a composite oxide of lithium and a transition metal, such as $LiCoO_2$, $LiNiO_2$, $LiNi_{0.8}Co_{0.2}O_2$, $LiMn_2O_4$ or $LiMnO_2$, has been known.

Especially, a lithium secondary cell employing a lithium-cobalt composite oxide ($LiCoO_2$) as a positive electrode active material and employing a lithium alloy or a carbon such as graphite or carbon fiber as a negative electrode, provides a high voltage at a level of 4 V and is widely used as a cell having a high energy density.

However, in the case of a non-aqueous electrolyte secondary cell employing $LiCoO_2$ as a positive electrode active material, it was desired to further improve the capacity density per unit volume of the positive electrode layer, and the safety, and further, there was a problem in the uniform coating property for an electrode coating film, a problem of deterioration of the cycle characteristics such that the discharge capacity of the cell gradually decreases as the charge/discharge cycle is repeated, a problem in the weight capacity density, or a problem of large decrease of the discharge capacity at a low temperature.

In order to solve a part of such problems, JP-A-6-243897 proposes that the average particle size of $LiCoO_2$, as a positive electrode active material, is made to be from 3 to 9 µm, the volume occupied by a group of particles having particle sizes of from 3 to 15 µm, is made to be at least 75% of the total volume, and the intensity ratio of diffraction peaks at 2θ=about 19° and 45 as measured by X-ray diffraction using $CuK_\alpha$ as a ray source, is made to have a specific value, to obtain an active material excellent in the coating property, self-discharge characteristics and cycle characteristics. The publication further proposes, as a preferred embodiment, $LiCoO_2$ which has particle sizes having substantially no particle size distribution in a range of at most 1 µm or at least 25 µm. With such a positive electrode active material, the coating property and the cycle characteristics are improved, but one satisfying the safety, the volume capacity density and the weight capacity density has not been obtained.

Further, in order to improve the weight capacity density and the charge/discharge cycle characteristics, JP-2000-82466 proposes a positive electrode active material made of lithium composite oxide particles having an average particle size of from 0.1 to 50 µm, and having at least two peaks in the particle size distribution. Further, it is also proposed to obtain such a positive electrode active material having at least two peaks in the particle size distribution, by mixing two types of positive electrode active material having different average particle size. By such a proposal, the weight capacity density of the positive electrode and the charge/discharge cycle characteristics may be improved, but it is cumbersome to prepare two types of positive electrode raw material powders having different particle size distributions, and one satisfying all of requirements for the volume capacity density of the positive electrode, the safety, the coating uniformity, the weight capacity density and the cycle characteristics, has not been obtained.

Further, in order to solve the problem regarding to the cell characteristics, JP-A-3-201368 proposes to replace from 5 to 35% of Co atoms with W, Mn, Ta, Ti or Nb, for improvement of the cycle characteristics.

Further, JP-A-10-312805 proposes to improve the cycle characteristics by using as a positive electrode active material $LiCoO_2$ of a hexagonal system having a crystallite diameter of from 45 to 100 nm in a (110) direction of the crystallite, wherein the length of c axis of lattice constant is at most 14.051 Å.

Further, JP-A-10-72219 proposes that a lithium composite oxide having the formula $Li_xM_{1-y}N_yO_2$ (wherein $0<x<1.1$, $0 \leq y \leq 1$), with primary particles being a plate or columnar form, having ("volume base cumulative 95% size"–"volume base cumulative 5% size")/"volume base cumulative 5% size" of at most 3, and having an average particle size of from 1 to 50 µm, has a high initial discharge capacity per weight and an excellent charge/discharge cycle durability.

However, by the above-mentioned conventional techniques, with respect to a lithium secondary cell using as a positive electrode active material a lithium-transition metal composite oxide, no product has been obtained which fully satisfies all of requirements for the volume capacity density, the safety, the coating uniformity, the cycle characteristics and the low temperature characteristics.

It is an object of the present invention to provide a novel lithium-transition metal composite oxide having a large volume capacity density, high safety, excellent uniform coating property, excellent charge/discharge cycle durability and excellent low temperature characteristics and thus suitable as a positive electrode active material for a lithium secondary cell, a positive electrode for a lithium secondary cell employing it, and a lithium secondary cell.

DISCLOSURE OF THE INVENTION

The present invention provides a lithium-transition metal composite oxide which comprises particles of a lithium composite oxide represented by the formula $Li_xM_{1-y}N_yO_2$, wherein $0.2 \leq x \leq 1.2$, $0 \leq y \leq 0.7$, M is a transition metal element, and N is a transition metal element other than M or an alkaline earth metal element, wherein in the distribution curve of the cumulative volume particle size of said lithium composite oxide, the inclination of the curve at a cumulative volume fraction of 20% is at most 9%/µm, the inclination of the curve at a cumulative volume fraction of 80% is at least 3%/µm, and the average particle size is from 3 to 20 µm.

As described in detail below, the present inventors have found that the above-mentioned lithium-transition metal composite oxide having specific chemical composition and particle size distribution, and having a specific spectrum form of the X-ray diffraction based on the crystal structure, has a large volume capacity density, high safety, excellent uniform coating property, excellent charge/discharge cycle durability, and excellent low temperature characteristics, as a positive electrode active material for a lithium secondary cell.

The reason why the present invention provides such excellent characteristics is not clearly understood. However, it is considered that in combination with the specific chemical composition containing a transition metal element, which characterizes the present invention, when in the cumulative volume vs. particle size distribution curve, the inclination of the curve at a cumulative volume fraction of 20% and the inclination of the curve at a cumulative volume fraction of 80%, are respectively in their specific ranges, the compression flow of the particles during pressing in the process for producing the electrode, becomes easy with such lithium-transition metal composite oxide particles, and the weight per unit volume of the electrode can thereby be increased, whereby the capacity per unit volume of the electrode can be increased.

BEST MODE FOR CARRYING OUT THE INVENTION

Figure 1:
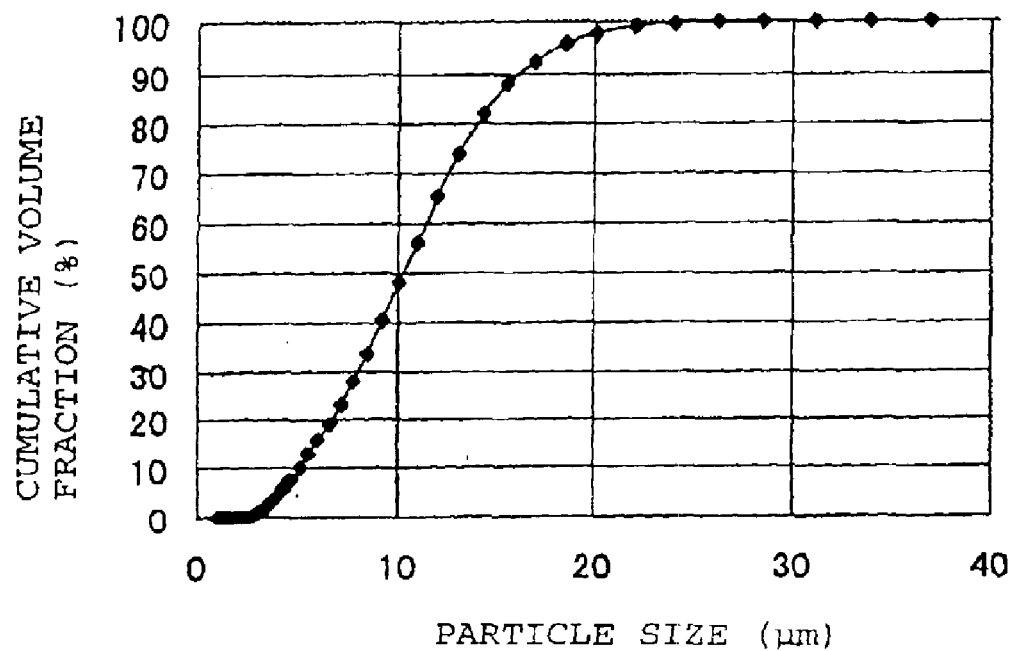
FIG. 1: A cumulative volume distribution curve of the lithium-transition metal composite oxide of the present invention in Example 1 is shown.

Now, the present invention will be described in further detail with reference to preferred embodiments of the present invention.

The lithium-transition metal composite oxide of the present invention is represented by the formula $Li_xM_{1-y}N_yO_2$ (wherein $0.2 \leq x \leq 1.2$, $0 \leq y \leq 0.7$, M is a transition metal element, N is a transition metal element other than M, or an alkaline earth metal element). Here, M is a transition metal element, and represents metals of Group 4, 5, 6, 7, 8, 9, 10 and 11 in the Periodic Table. Among them, Co, Ni or Mn is preferred. Further, N is a transition metal element other than M, or an alkaline earth metal element, and it may be one exemplified for M, as a transition metal element, and may, for example, be Ca, Mg, Sr or Ba, as an alkaline earth metal element.

Further, as mentioned above, x is $0.2 \leq x \leq 1.2$, and particularly preferably $0.98 \leq x \leq 1.02$ from the viewpoint of the capacity developing property. y is a value satisfying $0 \leq y \leq 0.7$. By selecting y from such a range so that a part of M being a transition metal element, is replaced by N in the above-mentioned formula, to introduce N, the high temperature storage characteristics, low temperature discharge characteristics, cycle characteristics, safety, etc. of a lithium secondary cell can be improved.

Among the above-mentioned cases, a case where M is Co or Ni, is particularly preferred, since the charge/discharge cycle stability, weight capacity density and volume capacity density can thereby be made high. When M is Co, a preferred example of N is at least one element selected from the group consisting of Ti, Zr, Hf, V, Nb, Ta, Mg, Ca, Sr, Ba, Al, Fe and Mn. Among these, N is particularly preferably Ti, Zr, Hf, V, Nb or Ta from the viewpoint of the effect of incorporation and the capacity developing property, no environmental pollution, cost, etc. Further, in this case, y is preferably $0 \leq y \leq 0.05$ from the viewpoint of the capacity developing property. Particularly, from the viewpoint of the effect of incorporation and the capacity developing property, y is particularly preferably $0.0005 \leq y \leq 0.02$.

Further, when M is Ni, N is particularly preferably Co with a view to the cycle characteristics. From the viewpoint of the capacity developing rate and the effect of incorporation, y is preferably $0.0 \leq y \leq 0.4$. For example, $LiNi_{0.8}Co_{0.2}O_2$ is mentioned as a preferred composition. Further, in this case, the safety and capacity, and the discharge characteristics can be improved by further replacing a part of Co being element N, by Al, Mn or Ti, such being preferred. Among these, replacement by manganese or aluminum is preferred, and especifically, it is preferred to replace from 20 to 50% of cobalt element. Materials represented by composition formulae $LiNi_{0.6}Co_{0.3}Mn_{0.1}O_2$, $LiNi_{0.7}Co_{0.2}Al_{0.1}O_2$ and $LiNi_{0.6}Co_{0.2}Mn_{0.2}O_2$ may, for example, be particularly,preferred when the safety is required.

Further, a lithium-containing Ni—Mn lamellar composite oxide has a characteristic such that it provides high safety to the cell, such being preferred. A preferred composition is such that M is Ni, N comprises Mn, and y is $0.4 \leq y \leq 0.6$. But, if y exceeds 0.6, the hexagonal system can hardly be maintained, and accordingly, the charge/discharge cycle durability tends to decrease, such being undesirable.

Further, when M is Ni, N comprises Co and Mn, y is $0.4 \leq y \leq 0.7$, and the Co/Mn atomic ratio is from 1/4 to 4/1 or at least 4/1, the safety improvement effect by manganese decreases and the amount of expensive cobalt to be used increases, such being undesirable. If the Co/Mn atomic ratio is less than 1/4, the initial charge/discharge efficiency of the cell decreases, such being undesirable.

Further, when M is Ni, N comprises Co, and Al or Mn, y is $0.1 \leq y \leq 0.4$, and the Co/(Al or Mn) atomic ratio is from 1/4 to 4/1, or y is less than 0.1, the safety of the cell deteriorates, such being undesirable. When y exceeds 0.4, the discharge characteristics at a large current tend to deteriorate, such being undesirable.

The lithium-transition metal composite oxide of the present invention is characterized in that in the cumulative volume-particle size distribution curve, the inclination of the curve ($\delta V/\delta R$) at a cumulative volume fraction of 20%, is at most 9%/$\mu$m, and the inclination of the curve ($\delta V/\delta R$) at a cumulative volume fraction of 80%, is at least 3%/$\mu$m. Here, the particle size in the above-mentioned cumulative volume-particle size distribution curve in the present invention, means one with respect to the secondary particles, and the inclination of the curve is the inclination of the tangential line.

If the above-mentioned inclination of the curve at a cumulative volume fraction of 20%, is at least 9%/$\mu$m, the density of the electrode after press molding tends to decrease, and accordingly, the volume capacity density tends to decrease, such being undesirable. Particularly, the inclination of the curve at a cumulative volume fraction of 20%, is particularly preferably at most 7.5%/$\mu$m. Further, if the inclination of the curve at a cumulative volume fraction of 80%, is less than 3%/$\mu$m, the density of the electrode after pressing decreases, and accordingly, the volume capacity density tends to decease, such being undesirable. The inclination of the curve at a cumulative volume fraction of 80%, is particularly preferably at least 4.5%/$\mu$m.

The lithium composite oxide particle of the present invention, is not required to have two peaks in its particle size distribution curve. In order to have two peaks, it is necessary to mix active materials having different particle size distributions, and the cost is thereby increased, such being undesirable. By the present invention, the capacity per volume can be made to be equivalent or more as compared with the case where there are two peaks.

The lithium-transition metal composite oxide of the present invention is characterized in that the average particle size is from 3 to 20 μm. Here, the average particle size means the volume average particle size of the secondary particles having primary particles agglomerated or sintered one another, and means a volume base cumulative 50% size (D50) which is a particle size at a point where the cumulative volume curve becomes 50%, in the cumulative curve for the total volume of 100%, prepared by obtaining the particle size distribution based on volume. The particle size distribution means the frequency distribution and the cumulative volume distribution curve measured by a laser scattering particle size distribution measurement apparatus.

Here, in the present invention, in the cumulative curve for the total volume of 100%, the particle sizes at points where the cumulative volume curve becomes 5%, 20%, 80% and 95%, are designated to be volume base cumulative 5% size (D5), volume base cumulative 20% size (D20), volume base cumulative 80% size (D80) and volume base cumulative 95% size (D95), respectively. The measurement of the particle size is carried out by thoroughly dispersing the particles in a medium such as water by means of e.g. ultrasonic treatment and measuring the particle size distribution (for example, by using Microtrac HRAX-100, manufactured by Leeds & Northrup Corp.).

In the present invention, if the average particle size D50 of the lithium-transition metal composite oxide is less than 3 μm, it usually becomes difficult to remove particles having particle sizes of at most 1 μm, and the safety, voltage retention and uniform coating for a thick film tend to deteriorate, such being undesirable. On the other hand, if D50 is at least 20 μm, it usually becomes difficult to remove particles having particle sizes of at least 40 μm, and striated non-uniformity tends to be formed on the coating surface of the electrode by such coarse particles, and the high rate characteristics or the initial capacity of the cell tends to decrease, such being undesirable. Particularly preferred average particle size D50 is from 5 to 15 μm.

Further, the lithium-transition metal composite oxide of the present invention is preferably one wherein the volume fraction of particles having particle sizes of less than 1 μm, is at most 0.1%, and the volume fraction of particles having particle sizes of more than 40 μm, is at most 0.5%. If the volume fraction of particles having particle sizes of less than 1 μm, is more than 0.1%, the safety or the voltage retention tends to decrease, such being undesirable. If the volume fraction of particles having particle sizes exceeding 40 μm, exceeds 0.5%, striated non-uniformity tends to be formed on the coating surface of the electrode by such coarse particles, such being undesirable. Especially, a case where the volume fraction of particles having particle sizes of less than 1 μm, is at most 0.01%, and the volume fraction of particles having particle sizes exceeding 40 μm, is at most 0.1%, is particularly preferred.

Further, the lithium-transition metal composite oxide of the present invention is preferably one wherein the volume base cumulative 5% size D5 is at least 2 μm, and the volume base cumulative 95% size is at most 30 μm. If D5 is less than 2 μm, it usually becomes difficult to remove particles having particle sizes of at most 1 μm, and the safety, voltage retention and uniform coating of a thick film tend to deteriorate, such being undesirable. On the other hand, if D95 is more than 30 μm, it usually becomes difficult to remove particles having particle sizes of at least 40 μm, striated non-uniformity tends to be formed on the coating surface of the electrode by such coarse particles, and the high rate characteristic or the initial capacity of the cell tend to decrease, such being undesirable. Especially, a case where D5 is at least 3 μm and D95 is at most 20 μm, is particularly preferred.

In the present invention, a particularly preferred lithium-transition metal composite oxide may be a lithium-transition metal composite oxide wherein the inclination of the curve at a cumulative volume fraction of 20% is at most 7.5%/μm, the inclination of the curve at a cumulative volume fraction of 80% is at least 4.5%/μm, the volume fraction of particles having particle sizes of less than 1 μm is at most 0.01%, the volume fraction of particles having particle sizes of more than 40 μm is at most 0.1%, the volume base cumulative 5% size is at least 3 μm, and the volume base cumulative 95% size is at most 20 μm.

The present invention further provides a lithium-transition metal composite oxide wherein after the lithium-transition metal composite oxide powder is pressed under a pressure of 0.3 t/cm², the volume fraction of particles having particle sizes of less than 1 μm, is at most 0.1%. It has been found that depending on the firing method and firing conditions of the lithium-transition metal composite oxide powder, there is a case where the particle size distribution changes by coating onto the current collector such as an aluminum foil, drying and pressing, even if the volume fraction of particles having particle sizes of less than 1 μm is at most 0.01% before the coating slurry was prepared. This is considered to occur because at the time of pressing, deformation or collapse of the secondary particles is induced by a shearing stress of the pressing at portions of the secondary particles where the cohesive force is weak. In any case, such a phenomenon may cause a deterioration of the safety of the cell, and is undesirable. The method to evaluate the structural stability of the secondary particles of such a powder, has been investigated, and it has been found effective to employ a lithium-transition metal composite oxide wherein the volume fraction of particles having particle sizes of less than 1 μm, is at most 0.1% after compressed by pressing under a pressure of 0.3 t/cm². If the volume fraction of particles having particle sizes of less than 1 μm, is at least 0.1%, the safety of the cell decreases. The volume fraction of particles having particle sizes of less than 1 μm, is preferably at most 0.01% after the powder is compressed by pressing under a pressure of 0.3 t/cm².

Further, in the present invention, when the lithium-transition metal composite oxide powder is pressed under a pressure of 0.3 t/cm², with a view to improving the volume capacity density as an electrode, the apparent density of the powder is preferably at least 2.9 g/cm³, particularly preferably at least 3.1 g/cm³, when M is Co or Ni. Further, when M is Ni, the apparent density is preferably at least 2.5 g/cm³, particularly preferably at least 2.7 g/cm³. On the other hand, the above-mentioned apparent density is preferably at most 4. If the apparent density is more than 4, the internal resistance of the cell tends to be high when such a powder is used for the electrode, such being undesirable.

Further, it has been found preferred to use a powder having little pores inside of the secondary particles, in order to increase the volume capacity density of the positive electrode, by packing the particles of the lithium-transition metal composite oxide of the present invention to have a high density by compressive pressing. The porosity inside the secondary particles can be measured by a mercury injection type porosimeter. A differential and an integral (cumulative pore volume cc/g) of the volumes of pores having pore diameters of from 0.006 to 100 μm, are usually obtained. Specifically, the cumulative pore volume of pores having pore diameters of at most 1 μm. is preferably at most 0.03 cc/g. It is further preferably at most 0.01 cc/g.

Further, it has been found that with the lithium-transition metal composite oxide of the present invention, when M is Co and y is 0, the half-width of the diffraction peak for (110) face at 2θ=66.5±1°, as measured by the X-ray diffraction using CuK$_\alpha$ as a ray source, is preferably from 0.070 to 0.110°. The half-width of the diffraction peak means the width of the peak at ½ of the height of the peak, and it reflects the crystallite diameter in a certain specific direction of the lithium-containing composite oxide, and a relation is considered to be such that the smaller the crystallite diameter, the larger the half width of the peak. If such a half-width is less than 0.070°, the charge/discharge cycle durability, initial capacity, average discharge voltage or safety of the cell employing it as a positive electrode active material, tends to deteriorate. On the other hand, if such a half-width exceeds 0.110°, the initial capacity and safety of the lithium secondary cell tend to be low. Such a half-width is particularly preferably from 0.080 to 0.100°.

Further, it has been found that with the lithium-transition metal composite oxide of the present invention, when M is Co, N is at least one member selected from the group consisting of Ti, Zr, Hf, V, Nb and Ta, and y is $0.0005 \leq y \leq 0.02$, the half-width of the diffraction peak for (110) face at 2θ=66.5±1°, as measured by the X-ray diffraction using CuK$_\alpha$ as a ray source, is preferably from 0.080 to 0.180°. If y is less than 0.0005, the cycle durability and the effect of improving low temperature operation efficiency tend to be low, and if y is more than 0.02, the initial capacity tends to decrease, such being undesirable. Particularly, y is preferably $0.001 \leq y \leq 0.01$, more preferably $0.002 \leq y \leq 0.007$. If the half-width is less than 0.080°, the charge/discharge cycle durability, initial capacity, average discharge voltage or safety of the cell employing it as a positive electrode active material, tends to deteriorate. On the other hand, if such a half-width exceeds 0.180°, the initial capacity and safety of the cell tend to be low, such being undesirable. Such a half-width is particularly preferably from 0.100 to 0.165°.

Further, it has been found that with the lithium-transition metal composite oxide of the present invention, when M is Ni, the half-width of the diffraction peak for (110) face in the vicinity of 2θ=65±1°, as measured by the X-ray diffraction using CuK$_\alpha$ ray, is preferably from 0.13 to 0.20°. If such a half-width is less than 0.13°, the charge/discharge cycle durability, initial capacity, average discharge voltage or safety tends to deteriorate. On the other hand, if such a half-width exceeds 0.20°, the initial capacity and safety tend to decrease, such being undesirable. Such a half-width is particularly preferably from 0.14 to 0.17°.

The lithium-transition metal composite oxide of the present invention can be produced by various methods, and the method is not restricted. But it is preferably produced as follows. For example, when M is Co, lithium carbonate or lithium hydroxide is preferably used as the lithium source for this lithium-cobalt composite oxide. As the cobalt source, tricobalt tetroxide or cobalt oxyhydroxide is preferred. The lithium-cobalt composite oxide having a particle size distribution and physical properties of the present invention, is produced particularly by controlling the particle size distribution and specific surface area of the cobalt source, and subjecting the mixed powder of the lithium source and cobalt source to firing treatment at from 700 to 1000° C. in an oxygen-containing atmosphere for from 5 to 20 hours, followed by cooling, pulverizing and classifying the fired material thus obtained. When tricobalt tetroxide is used, the powder having an average particle size of from 1 to 20 μm and a specific surface area of from 0.5 to 5 m$^2$/g is preferably used. When cobalt oxyhydroxide is used, the powder having an average particle size of from 1 to 20 μm and a specific surface area of from 2 to 200 m$^2$/g is preferably used. The average particle size of cobalt oxyhydroxide is particularly preferably from 4 to 15 μm.

When lithium carbonate is used as the lithium source, the powder having an average particle size of from 1 to 50 μm and a specific surface area of from 0.1 to 10 m$^2$/g is preferably used. The lithium-cobalt composite oxide of the present invention is preferably produced by using cobalt oxyhydroxide and lithium carbonate as raw materials and firing them as a mixture.

In the lithium-transition metal composite oxide of the present invention, when M is Co, an oxide or a hydroxide is used as a raw material for element N. As such an oxide or a hydroxide, Ta$_2$O$_5$ may be mentioned when N is tantalum, and titanium oxide TiO$_2$ may be mentioned when N is titanium. Titanium oxide includes an anatase type and a rutile type. It is particularly preferred to use an anatase type, since the cell properties will be good. When N is niobium, Nb$_2$O$_5$ may be mentioned and when N is zirconium, ZrO$_2$ may be mentioned. When N is hafnium, HfO$_2$ may be mentioned, and when N is vanadium, V$_2$O$_5$, V$_2$O$_3$ and VO$_2$ may be mentioned. If the average particle size of such an oxide or hydroxide exceeds 5 μm, the distribution of element N in the positive electrode active material particles tends to be non-uniform, whereby the effects of incorporating element N relating to the cell performance tend to decrease, such being undesirable. A preferred average particle size of such an oxide or a hydroxide is at most 1 μm, particularly at most 0.3 μm.

In the lithium-transition metal composite oxide of the present invention, when M is Co, if the specific surface area of the oxide or hydroxide of element N is less than 1 m$^2$/g, the reactivity tends to decrease, whereby the effects of incorporating element N relating to the cell performance tend to decrease, such being undesirable. Further, if the specific surface area of the oxide or hydroxide of element N exceeds 100 m$^2$/g, element N is uniformly incorporated into the crystal lattice, whereby the effects of incorporating element N relating to the cell performance tend to decrease, such being undesirable. A preferred specific surface area of the oxide or hydroxide of element N is from 2 to 20 m$^2$/g.

In the present invention, the lithium-nickel composite oxide wherein M is Ni, is also produced by various methods. Lithium carbonate or lithium hydroxide is preferably used as a lithium source. As a nickel source, nickel oxide, nickel oxyhydroxide or nickel hydroxide may, for example, be preferably used. In the present invention, when element M is Ni and element N is, for example, Co, such a method is preferred that the nickel source and the cobalt source are preliminarily subjected to e.g. co-precipitation to obtain an uniform mixed hydroxide or an uniform mixed oxide, which is mixed with lithium carbonate or lithium hydroxide, followed by firing, whereby an uniform lithium-nickel-cobalt composite oxide can be formed and a high electric capacity and an excellent cycle durability can be obtained, such being preferred.

When a positive electrode for a lithium secondary cell is to be prepared from the lithium-transition metal composite oxide of the present invention, it is formed by mixing to the composite oxide powder a carbon type conductive material such as acetylene black, graphite or ketjenblack, and a binder. As the binder, polyvinylidene fluoride, polytetrafluoroethylene, polyamide, carboxymethyl cellulose or an acrylic resin may, for example, preferably be employed.

A slurry or a kneaded product comprising the powder of the lithium-transition metal composite oxide of the present invention, an electrically conductive material and a binder, is prepared by using a solvent or dispersant, and it is supported on a positive electrode current collector made of e.g. an aluminum foil or a stainless steel foil by e.g. coating, to obtain a positive electrode sheet for a lithium secondary cell.

In the lithium secondary cell employing as a positive electrode active material the lithium-transition metal composite oxide of the present invention, a porous polyethylene film or a porous polypropylene film may, for example, be employed as a separator. Further, as the solvent for the electrolyte solution of the cell, various solvents may be used, and especially a carbonic ester is preferred. The carbonic ester may be cyclic or chain. The cyclic carbonic ester may, for example, be propylene carbonate or ethylene carbonate (EC). The chain carbonic ester may, for example, be dimethyl carbonate, diethyl carbonate (DEC), ethylmethyl carbonate (EMC), methylpropyl carbonate or methylisopropyl carbonate.

In the present invention, the above carbonic esters may be used alone or in combination as a mixture of two or more of them. Further, such an ester may be mixed with other solvent. Further, depending upon the material for the negative electrode active material, there may be a case where the discharge characteristics, cycle durability or charge/discharge efficiency can be improved by a combined use of a chain carbonic ester and a cyclic carbonic ester.

Further, in the lithium secondary cell employing as a positive electrode active material the lithium-transition metal composite oxide of the present invention, a gel polymer electrolyte containing a vinylidene fluoride/hexafluoropropylene copolymer (for example, Keiner, tradename, manufactured by Atochem Company) and vinylidene fluoride/perfluoropropyl vinyl ether copolymer, may be used.

As the solute to be added to the above electrolyte solvent or polymer electrolyte, at least one of lithium salts containing e.g. $ClO_4-$, $CF_3SO_3-$, $BF_4-$, $PF_6-$, $AsF_6-$, $SbF_6-$, $CF_3CO_2-$ or $(CF_3SO_2)_2N-$ as an anion, is preferably used. It is preferred to add the above lithium salt in the electrolyte solvent or polymer electrolyte at a concentration of from 0.2 to 2.0 mol/l. If the concentration departs from this range, the ion conductivity tends to decrease, and the electrical conductivity of the electrolyte tends to decrease. The concentration is more preferably adjusted to be from 0.5 to 1.5 mol/l.

In the lithium secondary cell employing as a positive electrode active material the lithium-transition metal composite oxide of the present invention, as the negative electrode active material, a material capable of absorbing and desorbing lithium ions, is employed. The material for such a negative electrode active material is not particularly limited, but, it may, for example, be a lithium metal, a lithium alloy, a carbon material, an oxide composed mainly of a metal of Group 14 or 15 of the Periodic Table, a carbon compound, a silicon carbide compound, a silicon oxide compound, titanium sulfide or a boron carbide compound. As the carbon material, one obtained by thermally decomposing an organic material by various thermal decomposition conditions, or artificial graphite, natural graphite, soil graphite, expanded graphite or scaly graphite, may, for example, be used. Further, as the oxide, a compound composed mainly of tin oxide, may be used. As the negative electrode current collector, a copper foil or a nickel foil may, for example, be used.

Such a negative electrode is obtained preferably by kneading the above-mentioned negative electrode active material with an organic solvent to obtain a slurry, and coating the slurry on a metal foil current collector, followed by drying and pressing.

There is no particular restriction as to the shape of the lithium cell employing as a positive electrode active material the lithium-transition metal composite oxide of the present invention. A sheet shape, a film shape, a folded-shape, a wounded bottomed cylindrical shape or a button shape, may suitably be selected depending upon the particular application.

EXAMPLES

Now, the present invention will be described in further detail with reference to Examples, but it should be understood that the present invention is by no means restricted to such Examples. Examples 1 to 7 and 14–17 are Examples of the present invention, and Examples 8 to 13 are Comparative Examples.

Example 1

A cobalt oxyhydroxide powder having a specific surface area of 65 $m^2/g$, a lithium carbonate powder having a specific surface area of 1.2 $m^2/g$, were mixed. The mixing ratio was such that the composition would be $LiCoO_2$ after firing. These two types of powders were dry-blended and then fired at 930° C. for 12 hours in air. The fired material thus obtained was pulverized and classified so that its average particle size became about 10 $\mu$m to obtain $LiCoO_2$ powder.

With respect to the $LiCoO_2$ powder after fired, pulverized and classified, the X-ray diffraction spectrum was obtained by using an X-ray diffraction apparatus (RINT model 2100, manufactured by Rigaku Corporation). In this powder X-ray diffraction using $CuK_\alpha$ ray, the half-width of the diffraction peak for (110) face in the vicinity of $2\theta=66.5\pm1°$, was 0.089°. Further, with respect to this $LiCoO_2$ powder, the cumulative pore volume of pores having pore diameters of from 0.006 to 1 $\mu$m was measured by a mercury injection type porosimeter, and as a result, the pore volume was at most 0.01 cc/g.

Figure 2:
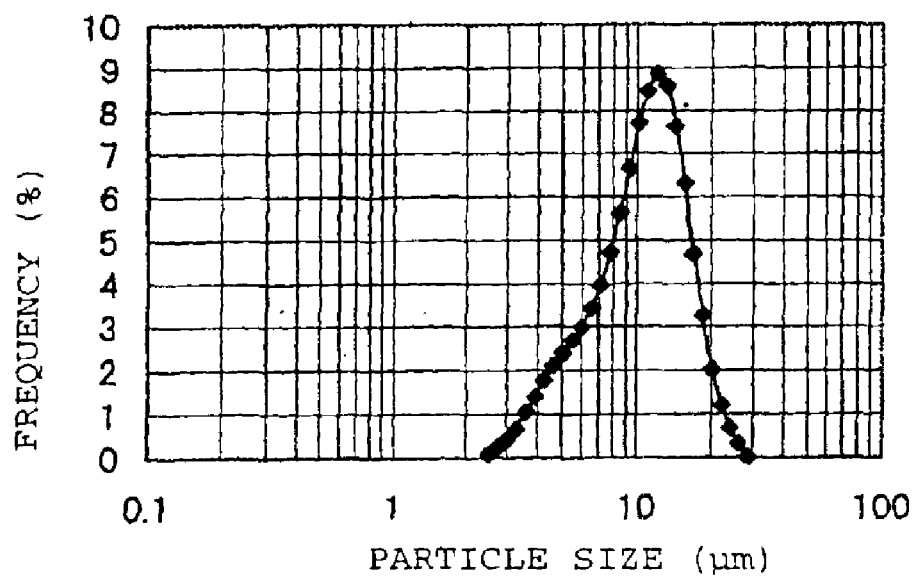
FIG. 2: A particle size frequency distribution curve of the lithium-transition metal composite oxide of the present invention in Example 1 is shown.

Further, the particle size distribution of above $LiCoO_2$ powder was measured by a laser scatter type particle size distribution measurement apparatus, and the result is shown in Table 1. Further, its cumulative volume distribution curve is shown in FIG. 1, and its particle size frequency distribution curve is shown in FIG. 2. From these results, it is evident that the particle size D5 is 4.4 $\mu$m, the particle size D95 is 17.8 $\mu$m, the volume fraction of particles having particle sizes of less than 1 $\mu$m is 0%, the volume fraction of particles having particle sizes of at least 40 $\mu$m is 0%, the inclination of the curve at a cumulative volume fraction of 20%, is 6.7%/$\mu$m, the inclination of the curve at a cumulative volume fraction of 80%, is 6.4%/$\mu$m, and the average particle size D50 is 10.3 $\mu$m.

The above $LiCoO_2$ powder was pressed under 0.3 t/$cm^2$ by a hydraulic press machine, and the apparent density after the pressing was 3.15 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

The LiCoO$_2$ powder thus obtained, acetylene black and a polyvinylidene fluoride powder, were mixed in a weight ratio of 90/5/5 and N-methyl pyrrolidone was added to the mixture to prepare a slurry. Then, one side of an aluminum foil having a thickness of 20 μm was coated with the slurry by e.g. a doctor-blade. A smooth coated surface was obtained, and there was no striation formed on the coated surface. Further, the adhesiveness was also good. It was dried and rolled by a roll-press to prepare a positive electrode sheet for a lithium cell. From the thickness of the positive electrode and the weight per unit area of the electrode layer, the density of the electrode layer was measured, and it was 3.28 g/cm$^3$.

Then, three stainless steel simple closed cell type lithium cells were assembled in an argon grove box, by using a member cut out from the above positive electrode sheet as a positive electrode, using a metal lithium foil having a thickness of 500 μm as a negative electrode, using a nickel foil of 20 μm as a negative electrode current collector, using a porous polypropylene film having a thickness of 25 μm as a separator, and using 1M concentration of LiPF$_6$/EC+DEC (1:1) solution (this means a mixed solution having LiPF$_6$ as a solute, and having a mass ratio of EC to DEC of (1:1), and the solvent described below also follows the same manner.) as an electrolyte. Further, separately, one stainless steel simple closed cell type cell was assembled in the argon grove box, by using 1M concentration of LiPF$_6$/EC+DEC+EMC (1:1:2) solution as an electrolyte.

With respect to one of the cells using EC+DEC (1:1) solution as the above electrolyte, charging was carried out to 4.3 V at a load current of 75 mA per g of the electrode active material at 25° C., and discharging was carried out to 2.5 V at a load current of 75 mA per g of the positive electrode active material, whereby the initial discharge capacity was obtained. Further, from the density and the capacity per unit weight of the electrode layer, the volume capacity density was obtained. Further, with respect to the cell, the charge/discharge cycle test was further carried out 30 times. As a result, the initial volume capacity density of the positive electrode layer at 25° C. at from 2.5 to 4.3V was 441 mAh/cm$^3$ per unit volume of the electrode layer, the volume capacity density after 30 charge/discharge cycles was 427 mAh/cm$^3$, and the capacity retention was 97%.

Further, other two cells using EC+DEC (1:1) solution as the above electrolyte, were charged respectively at 4.3V for 10 hours and at 4.7V for 12 hours, and disassembled in the argon grove box to take out the positive electrode sheets after charging. The positive electrode sheets were each washed, punched out in a size of 3 mm, and sealed together with EC in an aluminum capsule. The temperature was raised at a rate of 5° C./min by a scanning differential calorimeter, whereby the heat generation initiation temperature was measured. As a result, the heat generation initiation temperature of the electrode charged at 4.3V was 162° C. and the heat generation initiation temperature of the electrode charged at 4.7V was 95° C.

Further, the cell using EC+DEC+MEC (1:1:2) solution as the above electrolyte was charged at 25° C. and then cooled to –25° C. Then, discharging was carried out to 2.5 V by a load current of 75 mA per g of the positive electrode active material, whereby the initial discharge capacity at –25° C. was obtained, and the capacity developing rate at –25° C. was obtained, on the basis that the initial capacity at 25° C. was 100%. As a result, the capacity developing rate at –25° C. was 88%.

Example 2

In the same manner as in Example 1, a cobalt oxyhydroxide powder having a specific surface area of 87 m$^2$/g, and a lithium carbonate powder having a specific surface area of 1.0 m$^2$/g, were mixed. The mixing ratio was such that the composition would be LiCoO$_2$ after firing. These two types of powders were dry-blended and then fired at 900° C. for 12 hours in air in the same manner as in Example 1.

With respect to the powder pulverized and classified so that its average particle size became about 15 μm, the cumulative pore volume of pores having pore diameters of from 0.006 to 1 μm was measured by a mercury injection type porosimeter, and as a result, the pore volume was at most 0.01 cc/g.

With respect to the powder after pulverized and classified, the particle size distribution was measured in the same manner as in Example 1, and as a result, the particle size D5 was 7.4 μm, the particle size D95 was 24.1 μm, the volume fraction of particles having particle sizes of less than 1 μm was 0%, the volume fraction of particles having particle sizes of at least 40 μm was 0%, the inclination of the curve at a cumulative volume fraction of 20%, was 5.8%/μm, the inclination of the curve at a cumulative volume fraction of 80%, was 5.4%/μm, and the average particle size D50 was 15.3 μm.

The powder was pressed under 0.3 t/cm$^2$ by a hydraulic press machine, and the apparent density after the pressing was 3.25 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.095°. Further, in the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M LiPF$_6$/EC+DEC (1:1) solution as an electrolyte was 442 mAh/cm$^3$, and the heat generation initiation temperatures of the electrodes charged at 4.3V and 4.7V were 161° C. and 92° C., respectively. Further, the cell using EC+DEC+EMC (1:1:2) solution as an electrolyte was charged at 25° C. and then cooled to –25° C. Then, discharging was carried out to 2.5 V by a load current of 75 mA per g of the positive electrode active material, whereby the initial discharge capacity at –25° C. was obtained, and the capacity developing rate at –25° C. was obtained, on the basis that the initial capacity at 25° C. was 100%. As a result, the capacity developing rate at –25° C. was 87%.

Example 3

In the same manner as in Example 1, a cobalt oxyhydroxide powder having a specific surface area of 65 m$^2$/g, a lithium carbonate powder having a specific surface area of 1.2 m$^2$/g, and an anatase type titanium dioxide powder having a specific surface area of 9 m$^2$/g were mixed. The mixing ratio was such that the composition would be LiCo$_{0.998}$Ti$_{0.002}$O$_2$ after firing. These three types of powders were dry-blended and then fired at 900° C. for 12 hours in air in the same manner as in Example 1.

With respect to the powder pulverized and classified so that its average particle size became about 15 μm, the cumulative pore volume of pores having pore diameters of from 0.006 to 1 μm was measured by a mercury injection type porosimeter, and as a result, the pore volume was at most 0.01 cc/g.

With respect to the powder after pulverized and classified, the particle size distribution was measured in the same manner as in Example 1, and as a result, the particle size D5 was 5.2 μm, the particle size D95 was 25.9 μm, the volume fraction of particles having particle sizes of less than 1 μm was 0%, the volume fraction of particles having particle sizes of at least 40 μm was 0%, the inclination of the curve at a cumulative volume fraction of 20%, was 3.9%/μm, the inclination of the curve at a cumulative volume fraction of 80%, was 4.9%/μm, and the average particle size D50 was 15.1 μm.

The powder was pressed under 0.3 t/cm$^2$ by a hydraulic press machine, and the apparent density after the pressing was 3.30 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.122°. Further, in the same manner as in Example 1, the initial volume capacity density of the positive electrode layer, and the heat generation initiation temperatures of the electrodes respectively charged at 4.3V and 4.7V, of the cell using 1M concentration of LiPF$_6$/EC+DEC (1:1) solution as a electrolyte, were measured. The initial volume capacity density of the positive electrode layer was 444 mAh/cm$^3$, and the heat generation initiation temperatures of the electrodes charged at 4.3V and 4.7V were 158° C. and 93° C., respectively.

Further, the cell using 1M concentration of LiPF$_6$/EC+DEC+EMC (1:1:2) solution as an electrolyte was charged at 25° C. and then cooled to –25° C. Then, discharging was carried out to 2.5 V by a load current of 75 mA per g of the positive electrode active material, whereby the initial discharge capacity at –25° C. was obtained, and the capacity developing rate at –25° C. was obtained, on the basis that the initial capacity at 25° C. was 100%. As a result, the capacity developing rate at –25° C. was 94%.

Example 4

In the same manner as in Example 1, a cobalt oxyhydroxide powder having a specific surface area of 87 m$^2$/g, a lithium carbonate powder having a specific surface area of 1.0 m$^2$/g, and a niobium oxide Nb$_2$O$_5$ powder having a specific surface area of 5.3 m$^2$/g were mixed. The mixing ratio was such that the composition would be LiCu$_{0.998}$Nb$_{0.002}$O$_2$ after firing. These three types of powders were dry-blended and then fired at 900° C. for 12 hours in the air.

With respect to the powder pulverized and classified so that its average particle size became about 10 μm, the cumulative pore volume of pores having pore diameters of from 0.006 to 1 μm was measured by a mercury injection type porosimeter, and as a result, the pore volume was at most 0.01 cc/g.

With respect to the powder after pulverized and classified, the particle size distribution was measured in the same manner as in Example 1, and as a result, the particle size D5 was 3.0 μm, the particle size D95 was 17.7 μm, the volume fraction of particles having particle sizes of less than 1 μm was 0%, the volume fraction of particles having particle sizes of at least 40 μm was 0%, the inclination of the curve at a cumulative volume fraction of 20%, was 3.9%/μm, the inclination of the curve at a cumulative volume fraction of 80%, was 6.0%/μm, and the average particle size D50 was 9.8 μm.

The powder was pressed under 0.3 t/cm$^2$ by a hydraulic press machine, and the apparent density after the pressing was 3.32 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.113°. Further, in the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of LiPF$_6$/EC+DEC (1:1) solution as an electrolyte, was 447 mAh/cm$^3$, and the heat generation initiation temperatures of the electrodes charged at 4.3V and 4.7V were 157° C. and 93° C., respectively. Further, the cell using 1M concentration of LiPF$_6$/EC+DEC+EMC (1:1:2) solution as an electrolyte was charged at 25° C. and then cooled to –25° C. Then, discharging was carried out to 2.5 V by a load current of 75 mA per g of the positive electrode active material, whereby the initial discharge capacity at –25° C. was obtained, and the capacity developing rate at –25° C. was obtained, on the basis that the initial capacity at 25° C. was 100%. As a result, the capacity developing rate at –25° C. was 94%.

Further, in the above case, an effect of improving the low temperature characteristics was observed also in a cell employing as the positive electrode tantalum oxide or zirconium oxide instead of niobium oxide.

Example 5

In the same manner as in Example 1, a cobalt oxyhydroxide powder having a specific surface area of 65 m$^2$/g, a lithium carbonate powder having a specific surface area of 1.2 m$^2$/g, and an anatase type titanium dioxide powder having a specific surface area of 9 m$^2$/g were mixed. The mixing ratio was such that the composition would be LiCu$_{0.998}$Ti$_{0.002}$O$_2$ after firing. These three types of powders were dry-blended and then fired at 850° C. for 12 hours in the air.

With respect to the powder pulverized and classified so that its average particle size became about 15 μm, the cumulative pore volume of pores having pore diameters of from 0.006 to 1 μm was measured by a mercury injection type porosimeter, and as a result, the pore volume was at most 0.01 cc/g.

With respect to the powder after fired, pulverized and classified, the particle size distribution was measured in the same manner as in Example 1, and as a result, the particle size D5 was 3.0 μm, the particle size D95 was 17.7 μm, the volume fraction of particles having particle sizes of less than 1 μm was 0%, the volume fraction of particles having particle sizes of at least 40 μm was 0%. Further, the inclination of the curve at a cumulative volume fraction of 20%, was 3.8%/μm, the inclination of the curve at a cumulative volume fraction of 80%, was 5.7%/μm, and the average particle size D50 was 14.8 μm.

The powder was pressed under 0.3 t/cm$^2$ by a hydraulic press machine, and the apparent density after the pressing was 3.22 g/cm$^3$. This pressed pellet was unraveled by a hand and dispersed in water by an ultrasonic dispersion, to measure the particle size distribution again. As a result, the volume fraction of particles having particle sizes of at most 1 μm was 2.3%. It is evident that fine particles of at most 1 μm were formed by the pressing.

The X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.121°. In the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of LiPF$_6$/EC+DEC (1:1) solution as an electrolyte, was 443 mAh/cm$^3$, and the heat generation initiation temperatures of the electrodes charged at 4.3V and 4.7V were 154° C. and 89° C., respectively. Further, the cell using 1M concentration of LiPF$_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 94%.

Example 6

LiCoO$_2$ powder was produced in the same manner as in Example 1, except that a tricobalt tetroxide having a specific surface area of 0.61 m$^2$/g was used instead of cobalt oxyhydroxide. With respect to the powder after firing, the X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.130°.

With respect to the powder pulverized and classified so that its average particle size became about 3 μm, the cumulative pore volume of pores having pore diameters of from 0.006 to 1 μm was measured by a mercury injection type porosimeter, and as a result, the pore volume was at most 0.01 cc/g.

The particle size D5 was 0.45 μm, the particle size D95 was 4.6 μm, the volume fraction of particles having particle sizes of less than 1 μm was 14%, the volume fraction of particles having particle sizes of at least 40 μm was 0%. Further, the inclination of the curve at a cumulative volume fraction of 20%, was 4.1%/μm, the inclination of the curve at a cumulative volume fraction of 80%, was 5.5%/μm, and the average particle size D50 was 3.1 μm. The powder was pressed under 0.3 t/cm$^2$ by a hydraulic press machine, and the apparent density after the pressing was 3.25 g/cm$^3$.

In the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of LiPF$_6$/EC+DEC (1:1) solution as an electrolyte, was 432 mAh/cm$^3$, and the heat generation initiation temperatures of the electrodes charged at 4.3V and 4.7V were 145° C. and 83° C., respectively. Further, the cell using 1M concentration of LiPF$_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 89%.

Example 7

An ammine complex of nickel and cobalt was co-precipitated by carbon dioxide gas, and the co-precipitate was heated to obtain a nickel-cobalt co-precipitate hydroxide (atomic ratio is 0.8:0.2). Then, it was mixed with lithium hydroxide monohydrate powder, and fired at 515° C. for 20 hours. Further, in a flow of oxygen-nitrogen having an oxygen concentration of 40 volume %, firing was carried out by leaving the powder at 770° C. for 8 hours. After the firing, the powder was pulverized and classified so that its average particle size became about 9 μm.

With respect to the powder obtained, the X-ray diffraction spectrum was obtained in the same manner as in Example 1. In this powder X-ray diffraction using CuK$_\alpha$ ray, the half-width of the diffraction peak for (110) face in the vicinity of 2θ=65±1°, was 0.152°. The cumulative pore volume of pores having pore diameters of from 0.006 to 1 μm was measured by a mercury injection type porosimeter, and as a result, the pore volume was at most 0.01 cc/g.

With respect to the powder pulverized and fired, the particle size distribution was measured in the same manner as in Example 1, and as a result, the particle size D5 was 3.3 μm, the particle size D95 was 18.6 μm, the volume fraction of particles having particle sizes of less than 1 μm was 0%, the volume fraction of particles having particle sizes of at least 40 μm was 0%. Further, the inclination of the curve at a cumulative volume fraction of 20%, was 5.1%/μm, the inclination of the curve at a cumulative volume fraction of 80%, was 6.4%/μm, and the average particle size D50 was 9.6 μm. The powder was pressed under 0.3 t/cm$^2$ by a hydraulic press machine, and the apparent density after the pressing was 3.21 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using CuK$_\alpha$ ray, the half-width of the diffraction peak for (110) face in the vicinity of 2θ=66.5±1°, was 0.113°. In the same manner as in Example 1, the initial volume capacity density at from 2.7 to 4.3 V of the positive electrode layer made of the LiNi$_{0.80}$Co$_{0.20}$O$_2$ powder synthesized here, was measured. The initial volume capacity density of the positive electrode layer of the cell using 1M concentration of LiPF$_6$/EC+DEC (1:1) solution as an electrolyte, was 536 mAh/cm$^3$.

Example 8

LiCoO$_2$ powder was produced in the same manner as in Example 1, except that a tricobalt tetroxide having a specific surface area of 0.89 m²/g was used instead of cobalt oxyhydroxide. With respect to the powder pulverized and classified so that its average particle size became about 9 μm, the cumulative pore volume of pores having pore diameters of from 0.006 to 1 μm was measured by a mercury injection type porosimeter, and as a result, the pore volume was at most 0.01 cc/g.

Figure 3:
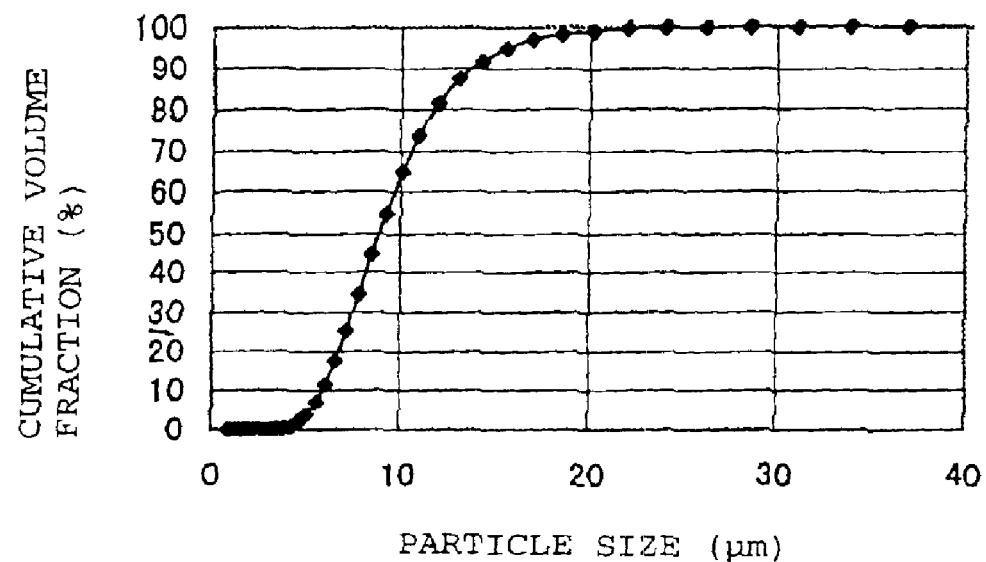
FIG. 3: A cumulative volume distribution curve of the lithium-transition metal composite oxide of a comparative example in Example 8 is shown.
Figure 4:
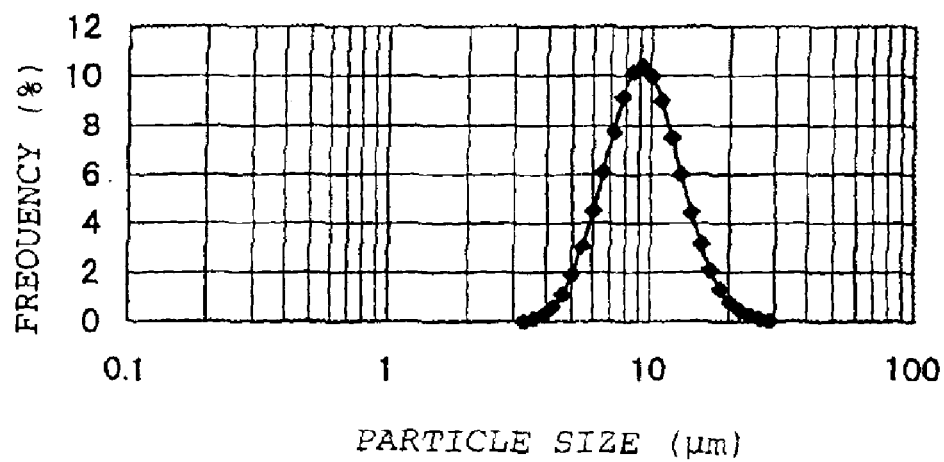
FIG. 4: A particle size frequency distribution curve of the lithium-transition metal composite oxide of a comparative example in Example 8 is shown.

Further, the particle size distribution was measured in the same manner as in Example 1, and the result is shown in Table 2. Further, its cumulative volume distribution curve is shown in FIG. 3, and its particle size frequency distribution curve is shown in FIG. 4. From these results, it is evident that the particle size D5 is 5.19 μm, the particle size D95 is 15.2 μm, the volume fraction of particles having particle sizes of less than 1 μm is 0%, the volume fraction of particles having particle sizes of at least 40 μm is 0%, the inclination of the curve at a cumulative volume fraction of 20%, is 13.1%/μm, the inclination of the curve at a cumulative volume fraction of 80%, is 7.5%/μm, and the average particle size D50 is 8.9 μm. The powder was pressed under 0.3 t/cm² by a hydraulic press machine, and the apparent density after the pressing was 2.85 g/cm³. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using $CuK_\alpha$ ray, the half-width of the diffraction peak for (110) face in the vicinity of $2\theta=66.5\pm1°$, was 0.133°. In the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of $LiPF_6$/EC+DEC (1:1) as an electrolyte, was 411 mAh/cm³, and the heat generation initiation temperatures of the electrodes charged at 4.3V and 4.7V were 151° C. and 88° C., respectively. Further, the cell using 1M concentration of $LiPF_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 89%.

Example 9

In Example 1, a cobalt oxyhydroxide powder having a specific surface area of 30 m²/g and a lithium carbonate powder having a specific surface area of 0.35 m²/g were mixed. The mixing ratio was such that the composition would be $LiCoO_2$ after firing. These two types of powders were dry-blended and then fired at 930° C. for 12 hours in air. $LiCoO_2$ powder was prepared in the same manner as in Example 1.

With respect to the powder pulverized and classified so that its average particle size became about 12 μm, the cumulative pore volume of pores having pore diameters of from 0.006 to 1 μm was measured by a mercury injection type porosimeter, and as a result, the pore volume was at most 0.01 cc/g.

With respect to the $LiCoO_2$ powder pulverized and classified, the particle size distribution was measured in the same manner as in Example 1. As a result, it is evident that the particle size D5 is 6.3 μm, the particle size D95 is 19.3 μm, the volume fraction of particles having particle sizes of less than 1 μm is 0%, the volume fraction of particles having particle sizes of at least 40 μm is 0%, the inclination of the curve at a cumulative volume fraction of 20%, is 10.3%/μm, the inclination of the curve at a cumulative volume fraction of 80%, is 7.1%/μm, and the average particle size D50 is 11.9 μm.

The powder was pressed under 0.3 t/cm² by a hydraulic press machine, and the apparent density after the pressing was 2.91 g/cm³. This pressed pellet was unraveled by a hand and dispersed in water by an ultrasonic dispersion, to measure the particle size distribution again. As a result, the volume fraction of particles having particle sizes of at most 1 μm was 0%.

The X-ray diffraction spectrum was obtained in the same manner as in Example 1. In this powder X-ray diffraction using $CuK_\alpha$ ray, the half-width of the diffraction peak for (110) face in the vicinity of $2\theta=66.5\pm1°$, was 0.087°. In the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of $LiPF_6$/EC+DEC (1:1) as an electrolyte, was 414 mAh/cm³, and the heat generation initiation temperatures of the electrodes charged at 4.3V and 4.7V were 157° C. and 88° C., respectively. Further, the cell using 1M concentration of $LiPF_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 88%.

Example 10

$LiCoO_2$ powder was produced in the same manner as in Example 1, except that a tricobalt tetroxide having a specific surface area of 1.2 m²/g was used instead of cobalt oxyhydroxide. With respect to the powder after firing, the X-ray diffraction spectrum was obtained in the same manner as in Example 1. In this powder X-ray diffraction using $CuK_\alpha$ ray, the half-width of the diffraction peak for (110) face in the vicinity of $2\theta=66.5\pm1°$, was 0.130°.

With respect to the powder pulverized and classified so that its average particle size became about 9 μm, the cumulative pore volume of pores having pore diameters of from 0.006 to 1 μm was measured by a mercury injection type porosimeter, and as a result, the pore volume was at most 0.01 cc/g.

The particle size D5 was 5.22 μm. the particle size D95 was 15.9 μm, the volume fraction of particles having particle sizes of less than 1 μm was 0%, the volume fraction of particles having particle sizes of at least 40 μm was 0%, the inclination of the curve at a cumulative volume fraction of 20%, was 20.3%/μm, the inclination of the curve at a cumulative volume fraction of 80%, was 14.7%/μm, and the average particle size D50 was 9.2 μm.

The powder was pressed under 0.3 t/cm² by a hydraulic press machine, and the apparent density after the pressing was 2.72 g/cm³. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 1, the initial volume capacity density of the positive electrode layer, and the heat generation initiation temperatures of the electrodes respectively charged at 4.3V and 4.7V, were obtained. The initial volume capacity density of the positive electrode layer of the cell using 1M concentration of $LiPF_6$/EC+DEC (1:1) solution as an electrolyte, was 399 mAh/cm$^3$, and the heat generation initiation temperatures of the electrodes charged at 4.3V and 4.7V were 150° C. and 87° C., respectively. Further, the cell using 1M concentration of $LiPF_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 87%.

Example 11

$LiCoO_2$ powder was produced in the same manner as in Example 1, except that a tricobalt tetroxide having a specific surface area of 1.5 m$^2$/g was used instead of cobalt oxyhydroxide. With respect to the powder after firing, the X-ray diffraction spectrum was obtained in the same manner as in Example 1. In this powder X-ray diffraction using $CuK_\alpha$ ray, the half-width of the diffraction peak for (110) face in the vicinity of 2θ=66.5±1°, was 0.135°.

With respect to the powder pulverized and classified so that its average particle size became about 10 μm, the cumulative pore volume of pores having pore diameters of from 0.006 to 1 μm was measured by a mercury injection type porosimeter, and as a result, the pore volume was at most 0.01 cc/g.

The particle size D5 was 5.16 μm, the particle size D95 was 14.8 μm, the volume fraction of particles having particle sizes of less than 1 μm was 0%, the volume fraction of particles having particle sizes of at least 40 μm was 0%, the inclination of the curve at a cumulative volume fraction of 20%, was 6.3%/μm, the inclination of the curve at a cumulative volume fraction of 80%, was 2.5%/μm, and the average particle size D50 was 9.8 μm.

The powder was pressed under 0.3 t/cm$^2$ by a hydraulic press machine, and the apparent density after the pressing was 2.98 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 1, the initial volume capacity density of the positive electrode layer and the heat generation initiation temperatures of the electrodes respectively charged at 4.3V and 4.7V, were obtained. The initial volume capacity density of the positive electrode layer of the cell using 1M concentration of $LiPF_6$/EC+DEC (1:1) solution as an electrolyte, was 399 mAh/cm$^3$, and the heat generation initiation temperatures of the electrodes charged at 4.3V and 4.7V were 151° C. and 87° C., respectively. Further, the cell using 1M concentration of $LiPF_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 89%.

Example 12

$LiCoO_2$ powder was produced in the same manner as in Example 1, except that a tricobalt tetroxide having a specific surface area of 0.75 m$^2$/g was used instead of cobalt oxyhydroxide. With respect to the powder after firing, the X-ray diffraction spectrum was obtained in the same manner as in Example 1. In this powder X-ray diffraction using $CuK_\alpha$ ray, the half-width of the diffraction peak for (110) face in the vicinity of 2θ=66.5±1°, was 0.132°.

With respect to the powder pulverized and classified so that its average particle size became about 10 μm, the cumulative pore volume of pores having pore diameters of from 0.006 to 1 μm was measured by a mercury injection type porosimeter, and as a result, the pore volume was at most 0.01 cc/g.

The particle size D5 was 5.76 μm, the particle size D95 was 15.8 μm, the volume fraction of particles having particle sizes of less than 1 μm was 0%, the volume fraction of particles having particle sizes of at least 40 μm was 0%, the inclination of the curve at a cumulative volume fraction of 20%, was 10.7%/μm, the inclination of the curve at a cumulative volume fraction of 80%, was 2.8%/μm, and the average particle size D50 was 10.2 μm.

The powder was pressed under 0.3 t/cm$^2$ by a hydraulic press machine, and the apparent density after the pressing was 2.94 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 1, the initial volume capacity density of the positive electrode layer and the heat generation initiation temperatures of the electrodes respectively charged at 4.3V and 4.7V, were obtained. The initial volume capacity density of the positive electrode layer of the cell, was 421 mAh/cm$^3$, and the heat generation initiation temperatures of the electrodes charged at 4.3V and 4.7V were 151° C. and 88° C., respectively. Further, the cell using 1M concentration of $LiPF_6$/EC+DEC+EMC (1:1:2) solution as an electrolyte was charged at 25° C. and then cooled to −25° C. Then, discharging was carried out to 2.5 V by a load current of 75 mA per g of the positive electrode active material, whereby the initial discharge capacity at −25° C. was obtained, and the capacity developing rate at −25° C. was obtained, on the basis that the initial capacity at 25° C. was 100%. As a result, the capacity developing rate at −25° C. was 86%.

Example 13

$LiNi_{0.80}Co_{0.2}O_2$ powder was produced in the same manner as in Example 7, except that a nickel-cobalt co-precipitate hydroxide (atomic ratio is 0.8:0.2) obtained by heating a co-precipitate obtained by co-precipitating an aqueous solution of nickel and cobalt chloride by an alkali, was used instead of the nickel-cobalt co-precipitate hydroxide (atomic ratio is 0.8:0.2) obtained by heating a co-precipitate obtained by co-precipitating an ammine complex of nickel and cobalt by carbon dioxide gas.

With respect to the powder after the firing, the X-ray diffraction spectrum was obtained in the same manner as in Example 7. In this powder X-ray diffraction using CuK$_\alpha$ ray, the half-width of the diffraction peak for (110) face in the vicinity of 2θ=65±1°, was 0.115°.

With respect to the powder pulverized and classified so that its average particle size became about 5 μm, the cumulative pore volume of pores having pore diameters of from 0.006 to 1 μm was measured by a mercury injection type porosimeter, and as a result, the pore volume was at most 0.01 cc/g.

The particle size D5 was 3.7 μm, the particle size D95 was 8.4 μm, the volume fraction of particles having particle sizes of less than 1 μm was 0%, the volume fraction of particles having particle sizes of at least 40 μm was 0%, the inclination of the curve at a cumulative volume fraction of 20%, was 27.9%/μm, the inclination of the curve at a cumulative volume fraction of 80%, was 13.5%/μm, and the average particle size D50 was 5.4 μm.

The powder was pressed under 0.3 t/cm$^2$ by a hydraulic press machine, and the apparent density after the pressing was 2.58 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 7, the initial volume capacity density of the positive electrode layer was obtained. The initial volume capacity density of the positive electrode layer of the cell using 1M concentration of LiPF$_6$/EC+DEC (1:1) solution as an electrolyte was 476 mAh/cm$^3$. It is evident that the initial volume capacity density in this case is significantly low as compared with Example 7 wherein the composition is the same.

Example 14

LiNi$_{0.60}$Co$_{0.2}$Mn$_{0.2}$O$_2$ powder was produced in the same manner as in Example 7, except that a nickel-cobalt-manganese co-precipitate hydroxide (atomic ratio is 0.6:0.2:0.2) obtained by heating a co-precipitate obtained by co-precipitating an aqueous solution of nickel, cobalt and manganese sulfate by an alkali, was used instead of the nickel-cobalt co-precipitate hydroxide (atomic ratio is 0.8:0.2) obtained by heating a co-precipitate obtained by co-precipitating an ammine complex of nickel and cobalt by carbon dioxide gas.

With respect to the powder after the firing, the X-ray diffraction spectrum was obtained in the same manner as in Example 7. In this powder X-ray diffraction using CuK$_\alpha$ ray, the half-width of the diffraction peak for (110) face in the vicinity of 2θ=65±1°, was 0.143°.

With respect to the powder pulverized and classified so that its average particle size became about 9 μm, the cumulative pore volume of pores having pore diameters of from 0.006 to 1 μm was measured by a mercury injection type porosimeter, and as a result, the pore volume was at most 0.01 cc/g.

The particle size D5 was 4.75 μm, the particle size D95 was 13.6 μm, the volume fraction of particles having particle sizes of less than 1 μm was 0%, the volume fraction of particles having particle sizes of at least 40 μm was 0%, the inclination of the curve at a cumulative volume fraction of 20%, was 6.5%/μm, the inclination of the curve at a cumulative volume fraction of 80%, was 7.0%/μm, and the average particle size D50 was 9.1 μm.

The powder was pressed under 0.3 t/cm$^2$ by a hydraulic press machine, and the apparent density after the pressing was 3.03 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 7, the initial volume capacity density of the positive electrode layer was obtained. The initial volume capacity density of the positive electrode layer of the cell using 1M concentration of LiPF$_6$/EC+DEC (1:1) solution as an electrolyte, was 502 mAh/cm$^3$.

Example 15

LiNi$_{0.70}$Co$_{0.2}$Al$_{0.1}$O$_2$ powder was produced in the same manner as in Example 7, except that a nickel-cobalt-aluminum co-precipitate hydroxide (atomic ratio is 0.7:0.2:0.1) obtained by heating a co-precipitate obtained by co-precipitating an aqueous solution of nickel, cobalt and aluminum sulfate by an alkali, was used instead of the nickel-cobalt co-precipitate hydroxide (atomic ratio is 0.8:0.2) obtained by heating a co-precipitate obtained by co-precipitating an ammine complex of nickel and cobalt by carbon dioxide gas.

With respect to the powder after the firing, the X-ray diffraction spectrum was obtained in the same manner as in Example 7. In this powder X-ray diffraction using CuK$_\alpha$ ray, the half-width of the diffraction peak for (110) face in the vicinity of 2θ=65±1°, was 0.152°.

With respect to the powder pulverized and classified so that its average particle size became about 8 μm, the cumulative pore volume of pores having pore diameters of from 0.006 to 1 μm was measured by a mercury injection type porosimeter, and as a result, the pore volume was at most 0.01 cc/g. The particle size D5 was 3.9 μm, the particle size D95 was 12.8 μm, the volume fraction of particles having particle sizes of less than 1 μm was 0%, the volume fraction of particles having particle sizes of at least 40 μm was 0%, the inclination of the curve at a cumulative volume fraction of 20%, was 5.8%/μm, the inclination of the curve at a cumulative volume fraction of 80%, was 7.5%/μm, and the average particle size D50 was 8.6 μm.

The powder was pressed under 0.3 t/cm$^2$ by a hydraulic press machine, and the apparent density after the pressing was 3.12 g/cm$^3$. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 7, the initial volume capacity density of the positive electrode layer was obtained. The initial volume capacity density of the positive electrode layer of the cell using 1M concentration of LiPF$_6$/EC+DEC (1:1) solution as an electrolyte, was 518 mAh/cm$^3$.

Example 16

LiNi$_{0.40}$CO$_{0.3}$Mn$_{0.3}$O$_2$ powder was produced in the same manner as in Example 7, except that a nickel-cobalt-manganese co-precipitate hydroxide (atomic ratio is 0.4:0.3:0.3) obtained by heating a co-precipitate obtained by co-precipitating an aqueous solution of nickel, cobalt and manganese sulfate by an alkali, was used instead of the nickel-cobalt co-precipitate hydroxide (atomic ratio is 0.8:0.2) obtained by heating a co-precipitate obtained by co-precipitating an ammine complex of nickel and cobalt by carbon dioxide gas. By the X-ray diffraction using CuK$_\alpha$ ray, it was found that the powder was R3-m and had a layer structure of hexagonal system.

With respect to the powder pulverized and classified so that its average particle size became about 10 μm, the cumulative pore volume of pores having pore diameters of from 0.006 to 1 μm was measured by a mercury injection type porosimeter, and as a result, the pore volume was at most 0.01 cc/g.

The particle size D5 was 3.36 μm, the particle size D95 was 14.8 μm, the volume fraction of particles having particle sizes of less than 1 μm was 0%, the volume fraction of particles having particle sizes of at least 40 μm was 0%, the inclination of the curve at a cumulative volume fraction of 20%, was 6.5%/μm, the inclination of the curve at a cumulative volume fraction of 80%, was 6.2%/μm, and the average particle size D50 was 10.2 μm.

The powder was pressed under 0.3 t/cm² by a hydraulic press machine, and the apparent density after the pressing was 3.09 g/cm³. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 7, the initial volume capacity density of the positive electrode layer was obtained. The initial volume capacity density of the positive electrode layer of the cell using 1M concentration of $LiPF_6$/EC+DEC (1:1) solution as an electrolyte, was 498 mAh/cm³.

Example 17

$LiNi_{0.5}Mn_{0.5}O_2$ powder was produced in the same manner as in Example 7, except that a nickel-manganese co-precipitate hydroxide (atomic ratio is 0.5:0.5) obtained by heating a co-precipitate obtained by co-precipitating an aqueous solution of nicke and manganese sulfate by an alkali, was used instead of the nickel-cobalt co-precipitate hydroxide (atomic ratio is 0.8:0.2) obtained by heating a co-precipitate obtained by co-precipitating an ammine complex of nickel and cobalt by carbon dioxide gas. By the X-ray diffraction using $CuK_\alpha$ ray, it was found that the powder was R3-m and had a layer structure of hexagonal system.

With respect to the powder pulverized and classified so that its average particle size became about 9 μm, the cumulative pore volume of pores having pore diameters of from 0.006 to 1 μm was measured by a mercury injection type porosimeter, and as a result, the pore volume was at most 0.01 cc/g.

The particle size D5 was 4.25 μm, the particle size D95 was 16.5 μm, the volume fraction of particles having particle sizes of less than 1 μm was 0%, the volume fraction of particles having particle sizes of at least 40 μm was 0%, the inclination of the curve at a cumulative volume fraction of 20%, was 6.5%/μm, the inclination of the curve at a cumulative volume fraction of 80%, was 5.5%/μm, and the average particle size D50 was 9.8 μm.

The powder was pressed under 0.3 t/cm² by a hydraulic press machine, and the apparent density after the pressing was 2.96 g/cm³. This pressed pellet was unraveled by a hand and dispersed in water by an ultrasonic dispersion, to measure the particle size distribution again. As a result, the volume fraction of particles having particle sizes of at most 1 μm was 0%.

In the same manner as in Example 7, the initial volume capacity of the positive electrode layer was obtained. The initial volume capacity density of the positive electrode layer of the cell using 1M concentration of $LiPF_6$/EC+DEC (1:1) solution as an electrolyte, was 450 mAh/cm³.

INDUSTRIAL APPLICABILITY

According to the present invention, it is possible to obtain a novel lithium-transition metal composite oxide having a large volume capacity density, high safety, excellent uniform coating property, excellent charge/discharge cycle durability and excellent low temperature characteristics, and suitable as a positive electrode active material for a lithium secondary cell.

TABLE 1

| PS μm | cu % | FR % | PS μm | CU % | FR % |
| --- | --- | --- | --- | --- | --- |
| 0.97 | 0.00 | 0.00 | 6.54 | 19.23 | 3.42 |
| 1.06 | 0.00 | 0.00 | 7.13 | 23.20 | 3.97 |
| 1.16 | 0.00 | 0.00 | 7.78 | 27.92 | 4.72 |
| 1.26 | 0.00 | 0.00 | 8.48 | 33.56 | 5.64 |
| 1.38 | 0.00 | 0.00 | 9.25 | 40.21 | 6.65 |
| 1.50 | 0.00 | 0.00 | 10.09 | 47.93 | 7.72 |
| 1.64 | 0.00 | 0.00 | 11.00 | 56.40 | 8.47 |
| 1.78 | 0.00 | 0.00 | 12.00 | 65.27 | 8.87 |
| 1.95 | 0.00 | 0.00 | 13.08 | 73.86 | 8.59 |
| 2.12 | 0.00 | 0.00 | 14.27 | 81.50 | 7.64 |
| 2.31 | 0.00 | 0.00 | 15.56 | 87.82 | 6.32 |
| 2.52 | 0.10 | 0.10 | 16.96 | 92.50 | 4.68 |
| 2.75 | 0.32 | 0.22 | 18.50 | 95.77 | 3.27 |
| 3.00 | 0.73 | 0.41 | 20.17 | 97.80 | 2.03 |
| 3.27 | 1.40 | 0.67 | 22.00 | 99.00 | 1.20 |
| 3.57 | 2.44 | 1.04 | 23.99 | 99.68 | 0.68 |
| 3.89 | 3.84 | 1.40 | 26.16 | 100.00 | 0.32 |
| 4.24 | 5.62 | 1.78 | 28.53 | 100.00 | 0.00 |
| 4.63 | 7.74 | 2.12 | 31.11 | 100.00 | 0.00 |
| 5.04 | 10.13 | 2.39 | 33.93 | 100.00 | 0.00 |
| 5.50 | 12.82 | 2.69 | 37.00 | 100.00 | 0.00 |
| 6.00 | 15.81 | 2.99 | 40.35 | 100.00 | 0.00 |

PS: Particle size
CU: Cumulative
FR: Frequency

TABLE 2

| PS μm | CU % | FR % | PS μm | CU % | FR % |
| --- | --- | --- | --- | --- | --- |
| 0.97 | 0.00 | 0.00 | 6.54 | 17.52 | 6.06 |
| 1.06 | 0.00 | 0.00 | 7.13 | 25.28 | 7.76 |
| 1.16 | 0.00 | 0.00 | 7.78 | 34.42 | 9.14 |
| 1.26 | 0.00 | 0.00 | 8.48 | 44.55 | 10.13 |
| 1.38 | 0.00 | 0.00 | 9.25 | 54.97 | 10.42 |
| 1.50 | 0.00 | 0.00 | 10.09 | 64.94 | 9.97 |
| 1.64 | 0.00 | 0.00 | 11.00 | 73.94 | 9.00 |
| 1.78 | 0.00 | 0.00 | 12.00 | 81.46 | 7.52 |
| 1.95 | 0.00 | 0.00 | 13.08 | 87.44 | 5.98 |
| 2.12 | 0.00 | 0.00 | 14.27 | 91.86 | 4.42 |
| 2.31 | 0.00 | 0.00 | 15.56 | 94.99 | 3.13 |
| 2.52 | 0.00 | 0.00 | 16.96 | 97.06 | 2.07 |
| 2.75 | 0.00 | 0.00 | 18.50 | 98.37 | 1.31 |
| 3.00 | 0.00 | 0.00 | 20.17 | 99.16 | 0.79 |
| 3.27 | 0.00 | 0.00 | 22.00 | 99.61 | 0.45 |
| 3.57 | 0.11 | 0.11 | 23.99 | 99.87 | 0.26 |
| 3.89 | 0.38 | 0.27 | 26.16 | 100.00 | 0.13 |
| 4.24 | 0.96 | 0.58 | 28.53 | 100.00 | 0.00 |
| 4.63 | 2.05 | 1.09 | 31.11 | 100.00 | 0.00 |
| 5.04 | 3.96 | 1.91 | 33.93 | 100.00 | 0.00 |
| 5.50 | 6.98 | 3.02 | 37.00 | 100.00 | 0.00 |
| 6.00 | 11.46 | 4.48 | 40.35 | 100.00 | 0.00 |

PS: Particle size
CU: Cumulative
FR: Frequency

What is claimed is:

1. A lithium-transition metal composite oxide which comprises particles of a lithium composite oxide represented by the formula $Li_xM_{1-y}N_yO_2$, wherein $0.2 \leq x \leq 1.2$, $0 \leq y \leq 0.7$, M is a transition metal element, and N is a transition metal element other than M or an alkaline earth metal element, wherein in the distribution curve of the cumulative volume particle size of said lithium composite oxide, the inclination of the curve at a cumulative volume fraction of 20% is at most 9%/μm, the inclination of the curve at a cumulative volume fraction of 80% is at least 3%/μm, and the average particle size is from 3 to 20 μm.

2. The lithium-transition metal composite oxide according to claim 1, wherein the cumulative volume fraction of particles having particle sizes of less than 1 μm, is at most 0.1%, and the cumulative volume fraction of particles having particle sizes of more than 40 μm, is at most 0.5%.

3. The lithium-transition metal composite according to claim 1 or claim 2, wherein the volume base cumulative 5% size is at least 2 μm, and the volume base cumulative 95% size is at most 30 μm.

4. The lithium-transition metal composite according to claim 1 or claim 2, wherein the inclination of the curve at a cumulative volume fraction of 20% is at most 7.5%/μm, the inclination of the curve at a cumulative volume fraction of 80% is at least 4.5%/μm, the volume fraction of particles having particle sizes of less than 1 μm is at most 0.01%, the volume fraction of particles having particle sizes of more than 40 μm is at most 0.1%, the volume base cumulative 5% size is at least 3 μm, and the volume base cumulative 95% size is at most 20 μm.

5. The lithium-transition metal composite oxide according to claim 1, wherein after the lithium-transition metal composite oxide powder is pressed under a pressure of $0.3t/cm^2$, the volume fraction of particles having particle sizes of less than 1 μm, is at most 0.1%.

6. The lithium-transition metal composite oxide according to claim 1, wherein M is Co.

7. The lithium-transition metal composite oxide according to claim 1, wherein M is Co, the half width of the diffraction peak for (110) face at $2\theta=66.5\pm1°$, is from 0.070 to 0.110° as measured by the X-ray diffraction using $CuK_\alpha$ as a ray source, and y is 0.

8. The lithium-transition metal composite oxide according to claim 1, wherein M is Co, the half width of the diffraction peak for (110) face at $2\theta=66.5\pm1°$, is from 0.080 to 0.180° as measured by the X-ray diffraction using $CuK_\alpha$ as a ray source, N is at least one member selected from the group consisting of Ti, Zr, Hf, V, Nb and Ta, and y is $0.0005 \leq y \leq 0.02$.

9. The lithium-transition metal composite oxide according to claim 1, wherein M is Ni.

10. The lithium-transition metal composite oxide according to claim 1, wherein M is Ni, N is Co, $0.1 \leq y \leq 0.4$, and the half width of the diffraction peak for (110) face at $2\theta=65\pm1°$ or its vicinity, is from 0.13 to 0.20°, as measured by the X-ray diffraction using $CuK_\alpha$ as a ray source.

11. The lithium-transition metal composite oxide according to claim 1, wherein M is Ni, N is Mn, and $0.4 \leq y \leq 0.6$.

12. The lithium-transition metal composite oxide according to claim 1, wherein M is Ni, N comprises Co and Mn, $0.4 \leq y \leq 0.7$, and the atomic ratio of Co/Mn is from 1/4 to 4/1.

13. The lithium-transition metal composite oxide according to claim 1, wherein M is Ni, N comprises Co and, Al or Mn, $0.1 \leq y \leq 0.4$ and the atomic ratio of Co/(Al or Mn) is from 1/4 to 4/1.

14. A positive electrode for a lithium secondary cell, employing the lithium-transition metal composite oxide as defined in claim 1, as a positive electrode active material.

15. A lithium secondary cell having the positive electrode as defined in claim 14.

* * * * *